(12) United States Patent
Klinnert et al.

(10) Patent No.: US 6,404,702 B1
(45) Date of Patent: Jun. 11, 2002

(54) SURVEILLANCE DEVICE FOR SIGNAL-ECHO SENSORS

(75) Inventors: Roland Klinnert, Korntal-Muenchingen (DE); Wolfgang Grimm, Allison Park, PA (US); Hauke Schmidt, East Palo Alto, CA (US); Bernhard Wirnitzer, Hemsbach (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/600,850

(22) PCT Filed: Dec. 29, 1998

(86) PCT No.: PCT/DE98/03804

§ 371 (c)(1),
(2), (4) Date: Oct. 20, 2000

(87) PCT Pub. No.: WO99/38029

PCT Pub. Date: Jul. 29, 1999

(30) Foreign Application Priority Data

Jan. 24, 1998 (DE) .......................... 198 02 724

(51) Int. Cl.⁷ .......................... G01S 15/10; G01S 15/08
(52) U.S. Cl. .......................... 367/100; 367/99; 342/145
(58) Field of Search .......................... 367/45, 87, 99, 367/100, 901; 342/118, 145

(56) References Cited

U.S. PATENT DOCUMENTS

| 4,054,862 A | 10/1977 | Backman, Jr. |
| 4,903,247 A | * 2/1990 | Van Gerwen et al. ...... 367/901 |
| 4,960,329 A | * 10/1990 | Schofield .................... 367/101 |
| 5,349,567 A | 9/1994 | Reed |
| 5,631,875 A | 5/1997 | Romes |
| 5,877,997 A | * 3/1999 | Fell .............................. 367/99 |
| 5,889,490 A | * 3/1999 | Wachter et al. ............. 367/100 |

FOREIGN PATENT DOCUMENTS

| DE | 40 23 538 A | 1/1992 |
| DE | 44 33 957 A | 3/1996 |
| EP | 0 642 033 A | 3/1995 |
| GB | 2350969 | * 12/2000 | ............ H04M/9/08 |
| WO | 93 06503 A | 4/1993 |
| WO | 97 11364 A | 3/1997 |
| WO | 97 28461 A | 8/1997 |

* cited by examiner

Primary Examiner—Ian J. Lobo
(74) Attorney, Agent, or Firm—Michael J. Striker

(57) ABSTRACT

The signal echo monitoring device includes a transmitting unit (5) for broadcasting a transmitted signal (s(t)) which is a group of randomly generated pulses, a receiving unit (6) for receiving an echo signal (e(t)), reflected by an object (12), of the transmitted signal and a combined control and evaluation unit (2) including a device (10) for jointly evaluating the transmitted signal (s(t)) and the echo signal (e(t)) with an integrated adaptive filter (14). The adaptive filter (14) automatically calibrates its impulse response b(t) and may be a digital filter.

21 Claims, 2 Drawing Sheets

SURVEILLANCE DEVICE FOR SIGNAL-ECHO SENSORS

BACKGROUND OF THE INVENTION

1. Field of the Invention

The invention relates to a monitoring device for signal echo sensors, preferably for measuring spacing between motor vehicles using ultrasonic pulses, and, more particularly, to a monitoring device for signal echo sensors that includes at least one transmitting unit for broadcasting a signal and at least one receiving unit for receiving a reflected or echo signal, reflected by an object, of the broadcast signal and a control and evaluation unit for generating the broadcast signal and evaluating the reflected or echo signal.

2. Prior Art

Various kinds of monitoring devices used as spacing sensors are known, based on various physical sensor principles, such as ultrasound, infrared, or microwaves. For instance, spacing sensors are known in which a pulse-type signal is transmitted by an evaluation unit, and the time is measured until the reception of an echo signal. Only after that is a new transmission pulse sent. A disadvantage proves to be the vulnerability of the system to identical kinds of signals received. For instance if ultrasound is used, if other vehicles located in the vicinity are also equipped with ultrasound monitoring devices, then misinterpretations or incorrect reports can result. If a different vehicle has the same pulse train frequency, for instance, then incorrect measurements can be made without being noticed, since the ultrasound monitoring device assumes that an echo signal is being received.

Furthermore, the known ultrasound sensors, which always use the same pulse train frequency, are only limitedly usable when there are multiple obstacles, since interfering multiple echoes are often interpreted incorrectly. In the case of multiple echoes, additional waiting times are also needed before a new transmission pulse can be sent. Even without such problems, at least the waiting time required by a signal to travel a maximum distance back and forth must be observed.

From German Patent Disclosure DE 40 23 538 A1, a collision warning device is also known, which by employing two sensors and so-called crosswise measurement can distinguish between walls, corners and edges. A disadvantage here is that the two sensors must be operated sequentially, making the system relatively slow. If the object moves between the measurements of the two sensors, this can lead to misinterpretations.

SUMMARY OF THE INVENTION

The object of the invention is to create an ultrasound monitoring device which by suppressing interference from ultrasound spacing sensors makes fast followup objects, even of moving objects possible.

This object, and others which will be made more apparent hereinafter, are attained in a monitoring device for signal echo sensors that includes at least one transmitting unit for broadcasting a transmitted signal and at least one receiving unit for receiving a reflected or echo signal, reflected by an object, of the transmitted signal and a control and evaluation unit for generating the broadcast signal and evaluating the reflected or echo signal.

According to the invention the at least one transmitting unit monitoring device generates the transmitted signal with a characteristic signal shape and the control and evaluation unit has an adaptive filter integrated therein for evaluating the echo signal jointly with the transmitted signal.

The preferably ultrasonic monitoring device according to the invention provides rapid detection of objects, even moving objects, by transmitting a characteristic signal shape, such as a random signal or a stochastic pulse train, which together with an echo signal is evaluated via an adaptive filter, integrated with an evaluation unit, for determining the spacing of an object from the transmitting unit. As a result, automatic suppression of any interference is also possible by use of the adaptive filter. Simultaneous operation of a plurality of sensors without mutual interference also proves to be advantageous, by using different random signals as transmission signals in conjunction with an adaptive filter. This adaptive filter can advantageously be embodied as a digital filter. Preferably, the filter is a so-called FIR (Finite Impulse Response) filter, which functions in nonrecursive fashion.

Advantageous features of the invention will become apparent from the characteristics recited in the dependent claims.

BRIEF DESCRIPTION OF THE DRAWING

The objects, features and advantages of the invention will now be illustrated in more detail with the aid of the following description of the preferred embodiments, with reference to the accompanying figures in which.

DESCRIPTION OF THE EXEMPLARY EMBODIMENT

Figure 1:
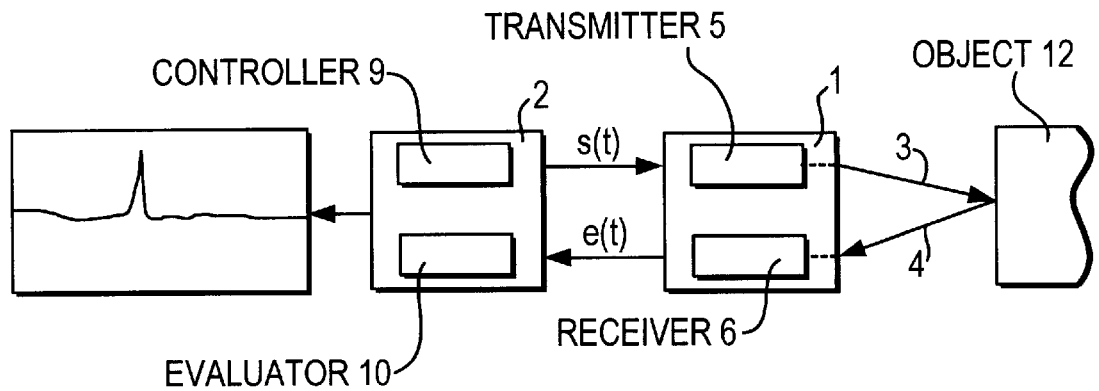
FIG. 1 is a block circuit diagram showing the structure of the ultrasound monitoring device.

FIG. 1 in a block circuit diagram shows the basic structure of the ultrasound monitoring device of the invention. This ultrasound monitoring device comprises a transmission and reception unit 1 and a control and evaluation unit 2. The transmission and reception unit 1 has a ultrasound transmitter 5 for broadcasting ultrasonic signals 3, and a ultrasound receiver 6 for receiving ultrasonic echos 4. If the transmission and reception operation can be done sequentially (as in the pulse-echo mode, for instance), then the transmitter 5 and receiver 6 can jointly utilize internal components of the transmission and reception unit 1, such as the broadcasting and reception diaphragms. The transmission and reception unit 1 converts transmission requirements from a control part 9 of the control and evaluation unit 2 into ultrasonic signals 3, transmits them using the ultrasound transmitter 5, and receives the echoes 4 with the ultrasound receiver 6. The sound signal 4 received is converted in the transmission and reception unit 1 into an electrical signal and is returned to an evaluation unit 10 in the control and evaluation unit 2. The control and evaluation unit 2 controls the ultrasound transmitter 5 in the transmission and reception unit 1 and from the electrical signal received determines the location of objects 12 that are located within the transmission range of the device. The control part 9 of the control and evaluation unit 2 generates a random signal s(t) and transmits it to the transmitting unit 5. The random signal s(t) is delivered, together with the electrical reception signal e(t), to the evaluation part 10 of the control and evaluation unit 2. The evaluation part 10 uses a so-called adaptive filter 14 to determine the delay between the transmission signal s(t) and the reception signal e(t).

Figure 2:
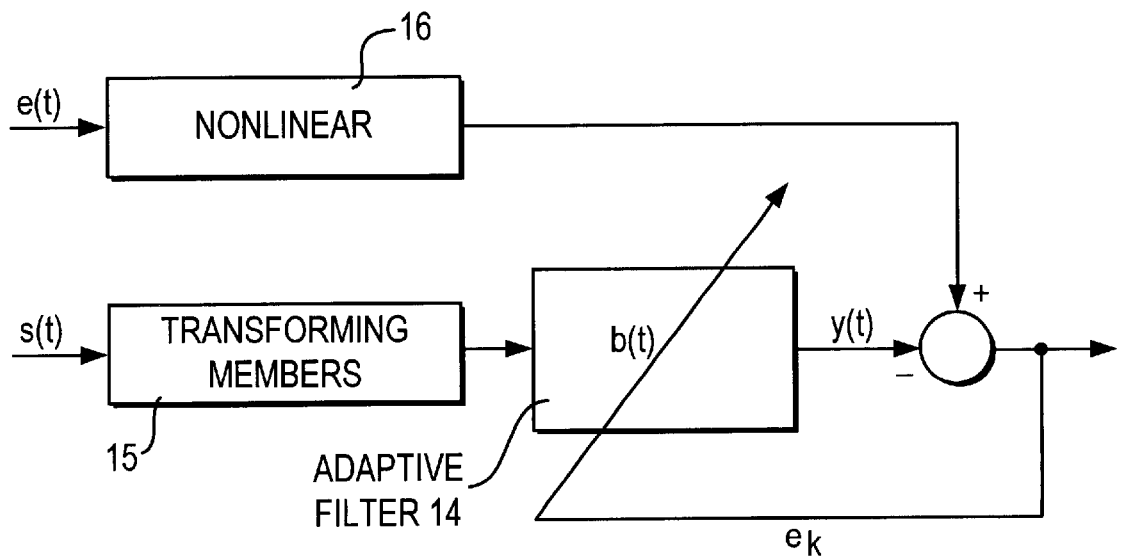
FIG. 2 is a block circuit diagram, showing the wiring of an adaptive filter.

FIG. 2 shows a block circuit diagram representing the wiring of an adaptive filter 14 of this kind. From the impulse response b(t) of the adaptive filter 14, the spacing of the object 12 detected can be learned directly from the location of output of a ultrasonic signal 3. The adaptive filter 14 automatically calibrates its coefficients in a known manner in such a way that the error f(t) between the filtered signal y(t) and the echo signal e(t) is minimized. As a result of this calibration, not only is the time lag between the two signals determined, but at the same time the influence of all the interference that may occur can be minimized.

The adaptive filter 14 is preferably designed as a digital transversal filter. In that case, the filter equation is as follows:

$$y(k \cdot D) = S i = 0 \ldots (N-1) b(i \cdot D) \times ((i-k) \cdot D),$$

with a scanning spacing D.

The number of filter coefficients N is typically between 100 and 1000, depending on the resolution and the maximum spacing of the objects 12 to be detected. The computation expense for such a filter is relatively high: At a scanning frequency of 50 kHz and for N=500, 25 million multiplications and additions per second must be performed, depending on the filtration. Even with the simplest algorithms, the adaptation of the filter coefficients, $b_i = b(t = iD)$ also requires at least the same computation cost, that is, at least 50 million additions and multiplications in all. Such computation performance levels can be attained only with digital signal processors, however.

The adaptive filter 14 automatically minimizes the influence of any type of interference of e(t) that is not correlated with the signal s(t). This also includes temperature drift or amplifier noise. The use of a random signal means that multiple collision warning devices can function simultaneously without interfering with one another. Objects in motion can be detected faster than in known sensors using the pulse-echo principle. The reason is that sound is broadcast quasi-continuously, and the transit time of the sound is measured equally continuously.

The nonlinearities 15, 16 in the evaluation unit 10 make a very efficient realization of the adaptive filter 14 possible without significantly affecting the sturdiness of the evaluation unit 10. The computation cost typically drops by a factor of 1000, making the system attainable economically with the aid of integrated circuits. As the nonlinearities 15 and 16, simple threshold value formations can be used; that is, the signal is set to "1" if the signal value is greater than the threshold value and to "0" if it is less than the threshold value. Thus within wide ranges, the signals s(t) and e(t) become 0, and a large proportion of the multiplications and additions become entirely unnecessary in the filter equation.

Figure 3:
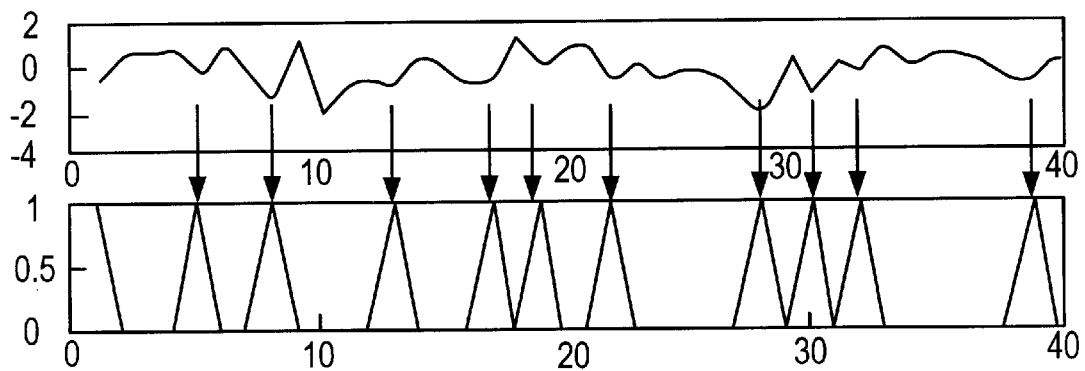
FIG. 3 is a graphical illustration showing the conversion of random signals into binary values.

FIG. 3 shows a variant in which further economies in terms of computation cost can be achieved. In this case, only at some points of the positive threshold value passages (each represented by an arrow) is the signal set to "1"; otherwise, it is set to "0". Thus a further portion of the multiplications and additions of the filter equation is dispensed with.

Figure 4:
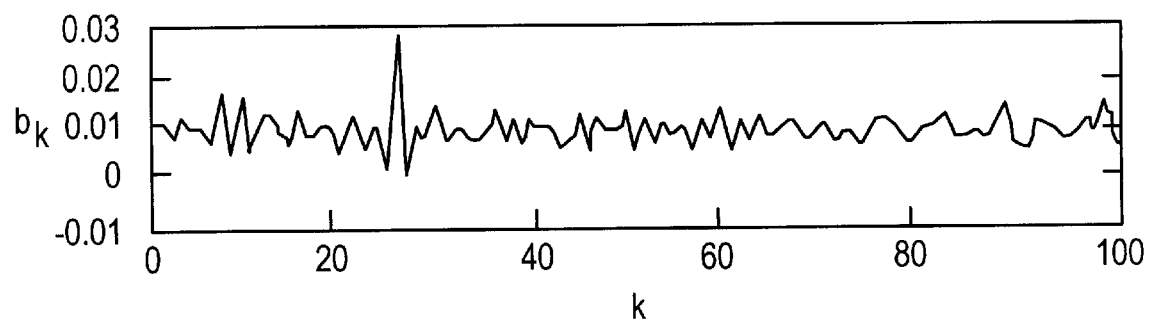
FIG. 4 is a graphical illustration showing the results of the evaluation unit during the operation of four interference signals.

FIG. 4, finally, in a graph shows the results of this kind of evaluation unit when four interfering transmitters are simultaneously in operation. In this case, four transmitters of the conventional type, each transmitting an identical signal by the pulse-echo principle, were added to the normal operation of the device according to the invention. On the horizontal axis of the graph shown in FIG. 4, the subscripts k of the coefficients $b_k$ of the filter unit are plotted. Since these subscripts correspond to fixed time intervals, the horizontal axis can at the same time be understood as a time axis. The coefficient values bk that result by the adaptation in each case are plotted on the vertical axis. A marked peak at the 25th scanning value can be seen. The coefficient value is approximately 0.03, compared to a mean value of 0.01 at the other points. This 25th scanning value can thus be associated, over the sound transit time, with the position or spacing of an object 12 from the ultrasound transmitting unit 5.

What is claimed is:

1. A signal echo monitoring device comprising:
   at least one transmitting means (5) for broadcasting a transmitted signal (s(t)) having a characteristic signal shape;
   at least one receiving means (6) for receiving an echo signal (e(t)), reflected by an object (12), of said transmitted signal; and
   means (10) for jointly evaluating said transmitting signal (s(t)) and said echo signal (e(t)), said means for jointly evaluating comprising an integrated adaptive filter (14) which determines a time delay between broadcasting of the transmitted signal (s(t)) and receiving the echo signal (e(t)).

2. The signal echo monitoring device as defined in claim 1, wherein said transmitted signal (s(t)) is a pulse train of randomly generated pulses.

3. The signal echo monitoring device as defined in claim 1, wherein said adaptive filter (14) has an impulse response (b(t)) that is automatically calibrated.

4. The signal echo monitoring device as defined in claim 1, wherein said adaptive filter (14) is a digital filter.

5. The signal echo monitoring device as defined in claim 1, wherein said adaptive filter (14) is a finite impulse response filter.

6. The signal echo monitoring device as defined in claim 1, further comprising respective nonlinear transforming members (15,16) connected with said adaptive filter (14) for processing said transmitted signal (s(t)) and echo signal (e(t)) prior to supplying said signals to said adaptive filter (14).

7. The signal echo monitoring device as defined in claim 1, wherein said transmitted signal (s(t)) has a variable transmission capacity.

8. The signal echo monitoring device as defined in claim 7, wherein said transmission capacity of said transmitted signal (s(t)) is reducible as a function of a mean reception capacity of said echo signal (e(t)).

9. The signal echo monitoring device as defined in claim 1, wherein said transmitted signal (s(t)) comprises a plurality of pulses and further comprising means for varying respective time intervals between said pulses as a function of mean reception capacity of said echo signal (e(t)).

10. The signal echo monitoring device as defined in claim 1, wherein said transmitted signal and said echo signal are both either sonic or electromagnetic signals.

11. The signal echo monitoring device as defined in claim 1, wherein said transmitted signal and said echo signal are both ultrasonic signals.

12. The signal echo monitoring device as defined in claim 1, wherein said transmitted signal and said echo signal are both either infrared, ultraviolet or microwave signals.

13. The signal echo monitoring device as defined in claim 1, further comprising a combined transmission and reception unit (1) comprising said at least one transmitting means and said at least one receiving means and means for operating said combined transmission and reception unit (1) alternately for transmitting said transmitted signal (s(t)) or for receiving said echo signal (e(t)).

14. A method of measuring distance to an object, said method comprising the steps of:
   a) broadcasting a transmitted signal (s(t)) from a transmitting means (5) in the vicinity of the object (12);
   b) receiving an echo signal (e(t)), reflected by the object (12), of the transmitted signal (s(t)) by a receiving means (6);
   c) determining a time delay between broadcasting of the transmitted signal in step a) and receiving the echo signal (e(t)) in step b) by means of an adaptive filter (14) of an evaluation means (10);
   whereby locations of objects within range of the transmitted signal (s(t)) are determined.

15. The method as defined in claim 14, wherein the adaptive filter (14) has an impulse response (b(t)) and said time delay is determined by evaluation of said impulse response (b(t)).

16. The method as defined in claim 14, wherein the transmitted signal and the echo signal are conducted through respective nonlinear transforming members (15,16) before input to the adaptive filter (14).

17. The method as defined in claim 16, wherein said respective nonlinear transforming members define corresponding threshold values for said transmitted and said echo signals for conversion into respective digital signals.

18. The method as defined in claim 16, further comprising setting said transmitted signal or said echo signal to a binary "1" only when said transmitted or echo signal exceeds a respective predetermined threshold value.

19. The method as defined in claim 16, further comprising squaring said transmitted signal and said echo signal prior to comparing with respective predetermined threshold values therefor.

20. The method as defined in claim 19, further comprising performing the comparing in a combined transmission and reception unit (1).

21. The method as defined in claim 16, further comprising digitizing at least one of said transmitted signal and second echo signal to form at least one digitized signal, subjecting said at least one digitized signal to a run length coding to form at least one run length coded digital signal and subsequently supplying said at least one run length coded digital signal to said adaptive filter.

* * * * *